Oct. 8, 1968     M. J. POPIK     3,405,337
FAIL OPERATIONAL CONTROL SYSTEM FOR REDUNDANT SERVOS WITH
TORQUE SIGNAL EQUALIZATION
Filed April 13, 1965     2 Sheets—Sheet 1

INVENTOR.
MICHAEL J. POPIK
BY
ATTORNEY

INVENTOR.
MICHAEL J. POPIK
BY
ATTORNEY

United States Patent Office 3,405,337
Patented Oct. 8, 1968

3,405,337
FAIL OPERATIONAL CONTROL SYSTEM FOR REDUNDANT SERVOS WITH TORQUE SIGNAL EQUALIZATION
Michael J. Popik, Phoenix, Ariz., assignor to Sperry Rand Corporation, Great Neck, N.Y., a corporation of Delaware
Filed Apr. 13, 1965, Ser. No. 447,668
10 Claims. (Cl. 318—18)

ABSTRACT OF THE DISCLOSURE

A fail operational control system in which control is switched automatically from a normally operative servo to a standby servo during malfunction with the torque signal from the normally operative servo being applied immediately to the standby servo to prevent transients and then permitted to gradually decay.

---

Figure 1:
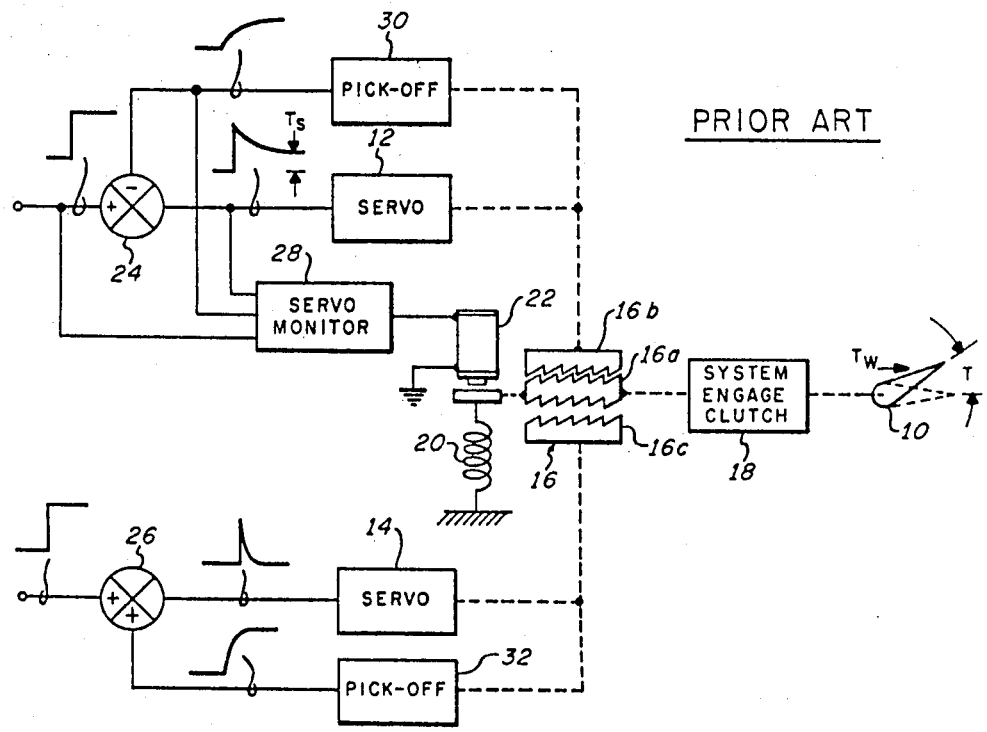

This invention relates in general to servomechanisms, and in particular it relates to improvements in redundant servo techniques, especially to those redundancy techniques which are employed in the automatic control of aircraft. An example of an aircraft autopilot redundancy arrangement is that shown and described in U.S. Patent 3,145,330, filed in the name of Herbert Hecht and assigned to the instant assignee.

Redundant servo techniques are employed in aircraft autopilots principally to meet safety requirements. In a two-redundant channel autopilot system, for example, both channels are so arranged that the failure of one will, at the least, leave the other still sufficiently effective to control safely the craft. What is safe control during cross-country flight is not, however, necessarily safe control during, say, a landing maneuver. During cross-country flight, transfer to a sole operable control channel may result in a transient change in the path along which the craft is flying, which transient condition is tolerable from a safety standpoint. Near the ground, however, the transient departure of the craft from a prescribed course may cause the craft to crash.

Transient craft departure from a prescribed course, whether cross-country or landing, will ordinarily occur when there is a failure in one of the redundant system channels while such system channel is in the process of driving a load, e.g., a craft control surface. So long as the redundant channels are in quiescent null states and not driving loads, the problem for which the invention finds a basis is generally nonexistent, this being for the simple reason that no action of the redundant channel that does not fail is required at the very instant the other fails.

A typical situation specially in need of the present invention is during the flareout portion of an aircraft landing maneuver. Here, at a predetermined low altitude on an Instrument Landing System defined glide slope, a bias signal, typically, is applied to redundant autopilot channels to deflect steadily the craft elevators and cause the craft to nose-up for a soft touchdown. Should a failure occur at this time, say about ten feet above the ground, the craft would undoubtedly have a transient flare path change as the still-operable autopilot channel tries to take over control of the craft, with attendantly a crash situation occurring. The present invention, in its preferred form, uses one normally operative autopilot channel and one normally disengaged idling channel in a standby, ready-to-assume control condition. And while it is not contended that this technique alone is new to the aircraft control art, what is done to such prior art technique to avoid its built-in deficiency, as noted above, does constitute invention. Accordingly, the following specification will first describe the prior art, with emphasis on the source of the problem eliminated, followed immediately by a description of how the invention modifies the prior art apparatus to overcome such problem.

A principal object of the invention is to provide improved servo apparatus.

Another object of the invention is to provide an improved arrangement of redundant servo systems.

Another object of the invention is to provide redundant servo systems wherein failure of one operating system has substantially no effect ever on the positioning of a load.

Another object of the invention is to provide improved aircraft autopilot apparatus having redundant control channels.

Another object of the invention is to provide autopilot apparatus having redundant control channels to drive an aircraft control surface, such apparatus being so arranged that failure of one channel has substantially no influence on the position of said control surface.

Figure 3:
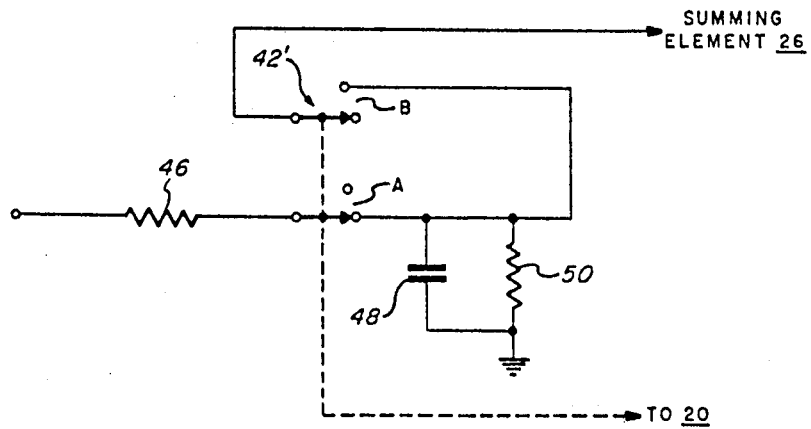
Figure 2:
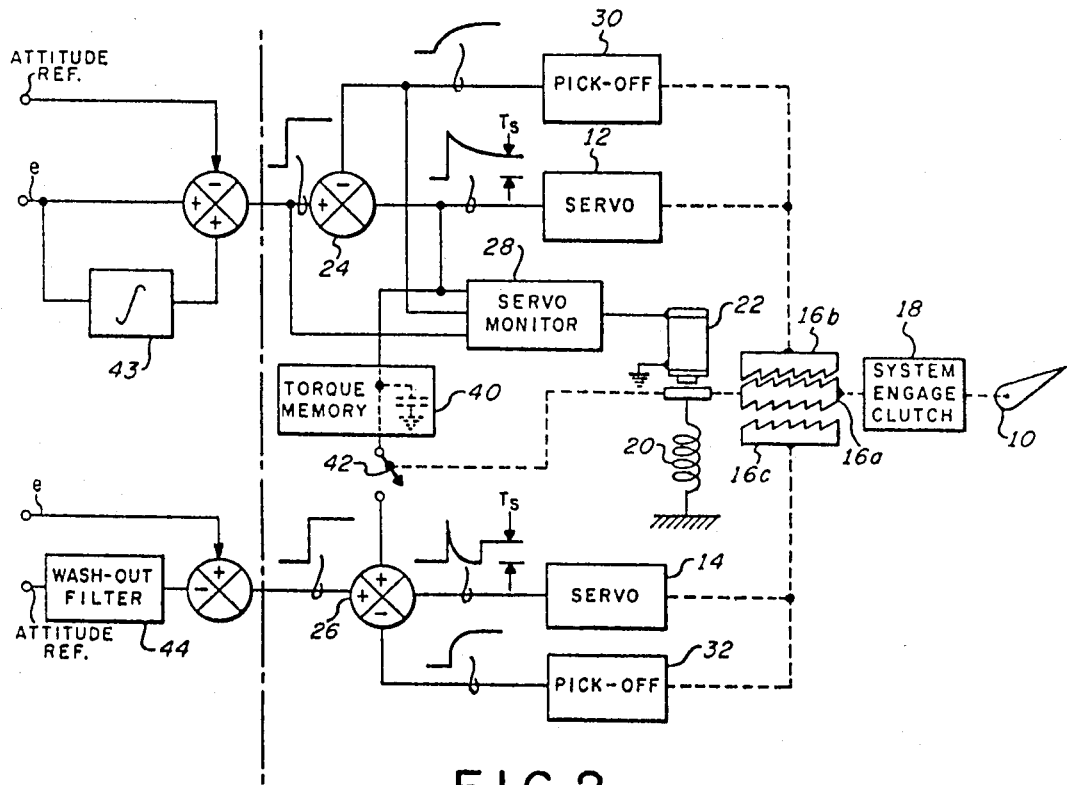
Figures 4A, 4B:
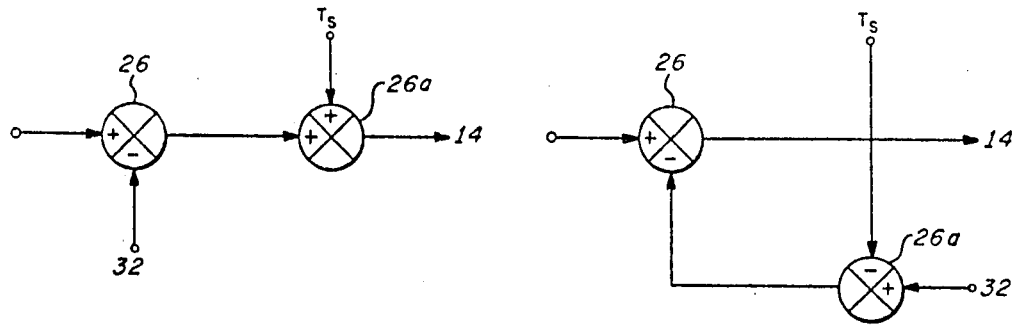

The invention will be described with reference to the figures wherein:

FIG. 1 is a block diagram of prior art apparatus over which the present invention provides an improvement, FIG. 2 is a block diagram of apparatus embodying the invention, FIG. 3 is a schematic diagram of a presently preferred circuit useful with the apparatus of FIG. 2, and FIGS. 4a and 4b are diagrams showing alternative signal processing arrangements according to the invention.

Referring to FIG. 1, an aircraft control surface 10 is positioned by a normally operative servo 12 of a two-channel autopilot having also a normally idling servo 14. The control surface 10 is positioned by the servo 12 through a transfer clutch 16 and through a system engage clutch 18, and while not shown, it is understood that the servos 12 and 14 are both adapted to have power simultaneously applied to them, and are both suitably damped. For purposes of description, the surface 10 is deliberately shown without trimming means to reduce its hinge moment to zero. The transfer clutch 16 is schematically shown having a positionable output plate member 16A which gets held against the input clutch member 16B, against the tension of a spring 20, when a relay 22 is actuated. When the relay 22 is denergized, the clutch output member 16A rests in contact with a clutch input member 16C.

Both servos 12 and 14 are provided with respective algebraic summing elements 24 and 26, and the servo 12 has associated with it a servo monitor device 28, the purpose of which is to detect when a malfunction occurs in the loop in which the servo 12 operates and, in response to such detected malfunction, to deenergize the relay 22. Servo monitors are well-known in the art as exemplified by U.S. Patents 2,823,877, 2,973,927, and 3,135,485, all of which are assigned to the instant assignee. (While not shown, a monitor device may also cooperate with the servo 14 to warn when a failure occurs in its loop.) The algebraic summing elements 24 and 26 receive input signals for example from a common sensor, or from redundant sensors as the case may be, which signals are respectively cancelled in feedback fashion by their respective servos, e.g., by feedback signals from pick-offs 30 and 32.

To understand the operation of the prior art apparatus of FIG. 1 and to point up the problem which the present invention solves, consider step input signals to both summing elements 24 and 26. With such the case, the servo 12 for an instant sees a high input signal, and as the servo 12 moves (in response to such signal, and via the clutches 16 and 18) the control surface 10 from a neutral position (indicated by dashed lines), the pick-off 30 output signal gradually rises to cut the amplitude of the servo 12 signal input. Eventually, however, a signal $T_S$ is steadily applied to the servo 12 just to keep the surface 10 deflected through an angle T against counter torques $T_W$, as might be caused for example by wind effects.

Inasmuch as there is essentially no counter torque experienced by the servo 14 in response to its associated step signal (while the servo 12 drives to position the control surface 10 through an angle T) the output shaft of the servo 14 snaps to a quiescent position to cancel such associated step signal and reduce the input signal to the servo 14 to zero. Examine now what happens when the servo monitor device 28 detects a servo 12 failure: The relay 22 deenergizes, releasing the clutch output member 16A to be engaged for movement by the servo 14. Since no signal is, at this instant (of failure) being applied to the input of the servo 14, the control surface 10 gets driven by the torque $T_W$ toward its neutral position, and in so doing moves the pick-off 32 input member toward its neutral position, whereupon a signal starts to appear at the input to the servo 14 to return the control surface to the angular location it had prior to failure of the servo 12. While such cause-effect-countercause is not intolerable at high altitudes, a flutter-like motion of a control surface can cause a catastrophic transient path change in an aircraft that is in close proximity to the ground.

To prevent the happening discussed immediately above, the present invention operates to freeze for a short time the position of the control surface 10 at the instant there is a failure in the servo 12 channel, and it does this by producing a signal representing effectively the memorized torque (exerted by the servo 12) on the surface 10 prior to such failure, and using such signal to prevent the output shaft of the servo 14 from being driven by the counter torque $T_W$. While a signal representing such torque on the control surface 10 may be had by locating a torque transducer anywhere in the linkage between the servo 12 and the control surface 10, the present invention in its preferred form simply takes the signal applied to the servo 12 (which by its nature represents the torque exerted on the control surface 10) and applies same to freeze momentarily the output shaft of the servo 14 "after" such servo is engaged.

Referring now to FIG. 2, the apparatus provided by the invention to improve the workings of the apparatus of the prior art is shown by means of bold lines. A memory circuit 40 stores the signal, e.g., the signal $T_S$, applied to the servo 12, and a switch 42 is adapted to apply such stored signal to the servo 14 only after the clutch plates 16A and 16C engage. Since the servo 14 is constantly in a null state, application of the stored signal $T_S$ to the servo 14 makes such servo "see" only what the servo 12 "saw" prior to its failure, and hence the control surface 10 is rendered momentarily immobile after transferring control of the surface 10 to the servo 14. See the signal waveform appearing at the input to the servo 14 of FIG. 2. The memory circuit 40, a preferred form of which is described later, must be capable of gradual discharge, whereby the servo 14 may gradually assume complete control over the positioning of the control surface 10, and while a mechanical actuation of the switch 42 is shown, it is obvious that electrical actuation thereof may also be employed to assure that the plates 16A and 16C engage before application of the memory signal to the servo 14. Such requirement is essential to prevent follow-up by the servo 14 at a time when no load is on its shaft.

In addition to the apparatus of the invention that prevents flutter-like motion of the control surface 10 on failure of the normally operating channel 12, the apparatus of the invention (when employed in an autopilot arrangement) includes means for negating the effects of dissimilar signal handling channels for the cooperating servos. That is, autopilots by their nature employ error signal integrators for, among other things, the purpose outlined in U.S. Patent 3,136,503, issued in the name of F. Campbell, and assigned to the instant assignee. Were the input signals processed by the two channels to be different in magnitude from each other, and since craft control is maintained either by means solely of the servo 12 or by means solely of the servo 14, the noncontrolling servo would normally drive continually in response to an integrated error signal (representing the integrated signal discrepancy between the signals processed by the two servos) as the controlling servo positionably controls the surface 10. Accordingly, the presently preferred apparatus of the invention employs a signal integrator 43 solely in the normally operating servo 12 channel, and instead of an integrator in the idling servo 14 channel, a wash-out network 44 for cancelling all steady state attitude errors is employed. Therefore, when the servo 12 is in a null state, so is the servo 14.

Referring now to FIG. 3, the presently preferred form of torque signal memorizing circuit is shown; such circuit is preferred because it operates both to filter away signals representing short duration torques on the surface 10, i.e., it works to memorize only an average torque, and because it allows for a takeover of control by the standby idling servo 14 after there is a system failure. FIG. 3 shows the simple switch 42 of FIG. 2 replaced by a single pole double throw switch 42', one part A of which is normally closed and the other part B of which is normally open. The normally closed part A connects a relatively low value input resistor 46 to an RC network consisting of a capacitor 48 and a relatively high value resistor 50. The signal appearing across the capacitor 48 is applied to the summing element 26 when the switch part B is closed. Hence, while the moderately short RC charging time constant of the circuit consisting of elements 46 and 48 and 50 works to average the torque signals, the long discharging time constant of the circuit consisting of elements 48 and 50 causes the memorized torque to be held long enough to prevent rapid control transients during takeover by the servo 14 control system.

While FIG. 2 shows the apparatus of the invention arranged to apply the memorized torque signal to the signal summing element 26, it is obvious that an additional summing element 26a may instead be employed to receive such signal, whereby in one case (FIG. 4a) such additional summing element 26a appears in the input part of the servo 14 loop, and in another case (FIG. 4b) the element 26a appears in the feedback part of the servo 14 loop.

While the invention has been described in its preferred embodiments, it is to be understood that the words which have been used are words of description rather than of limitation and that changes within the purview of the appended claims may be made without departing from the true scope and spirit of the invention in its broader aspects.

I claim:
1. Redundant servo apparatus comprising shaft means adapted to be driven, first algebraic summing means adapted to receive an input signal, first servo means being provided with first feedback means for producing a first feedback representative signal, said first servo means being connected normally to drive said shaft means in proportion to its applied signal, and said first feedback signal being applied to said first summing means, the output of which is applied to said first servo means, second algebraic summing means adapted to receive an input signal, second servo means being unconnected normally to drive said shaft means and being provided with second feedback means for producing a second feedback signal, said second feedback signal being applied to said second algebraic summing means, the output of which is applied to said second servo means, means for detecting malfunctions in said first servo means, means cooperating with said malfunction detection means for disconnecting said first servo means from said shaft means and connecting thereto instead said second servo means, means for memorizing the signal applied to said first servo means, means for applying said memorized signal to said second servo means immediately after said second servo means is connected to drive said shaft means, and means for gradually decaying the magnitude of said memorized signal after its application to said second servo means.

2. The apparatus of claim 1 wherein said memorizing means comprises a switch that is normally closed when said first servo means is connected to said shaft means, a resistor, and an RC circuit connected in series with said resistor by means of said switch, said switch being adapted to be open when said second servo means connects to drive said shaft means.

3. Apparatus employing redundant servos comprising first and second servo means, transfer clutch means for connecting either the first or the second servo means to the output member of said clutch means, means for connecting said clutch output member to said first servo means when said first servo means functions properly and for connecting said clutch output member to said second servo means when said first servo means malfunctions, means for applying to each of said servo means a signal representing the difference between an input signal and its respective feedback signal, means for memorizing the signal applied to said first servo means, means adapted to apply said memorized signal to said second servo means immediately after said second servo means connects to said clutch output member, and means for decaying the applied memorized signal after its application to said second servo means.

4. The apparatus of claim 3 wherein said signal memorizing means and said means for decaying the memorized signal are both embodied in a circuit comprising a switch that is normally closed when said first servo means is connected to said clutch output member, a resistor, and an RC circuit connected in series with said resistor by means of said switch, said switch being adapted to be open when said second servo means connects to drive said clutch output member.

5. In a servomechanism apparatus having shaft means adapted to be driven, first servo means adapted to receive an input signal, said servo means being connected normally to drive said shaft means in response to said signal, second servo means adapted to receive an input signal, said second servo means being normally unconnected to drive said shaft means, means for detecting malfunctions in said first servo means, and means cooperating with said malfunction detection means for disconnecting said first servo means from said shaft means and connecting thereto instead said second servo means, the apparatus comprising means for producing a torque signal representing the torque on said shaft means exerted by said first servo means, means for applying said torque signal to said second servo means immediately after said second servo means is connected to drive said shaft means, and means for gradually decaying the magnitude of said torque signal after its application to said second servo means.

6. In a servomechanism apparatus having shaft means adapted to be driven, first algebraic summing means adapted to receive an input signal, first servo means being provided with first feedback means for producing a first feedback representative signal, said first servo means being connected normally to drive said shaft means in proportion to its applied signal, and said first feedback signal being applied to said first summing means, the output of which is applied to said first servo means, second algebraic summing means adapted to receive an input signal, second servo means being unconnected normally to drive said shaft means and being provided with second feedback means for producing a second feedback signal, said second feedback signal being applied to said second algebraic summing means, the output of which is applied to said second servo means, means for detecting malfunctions in said first servo means, and means cooperating with said malfunction detection means for disconnecting said first servo means from said shaft means and connecting thereto instead said second servo means, the apparatus comprising means for memorizing the signal applied to said first servo means, means for applying said memorized signal to said second servo means immediately after said second servo means is connected to drive said shaft means, and means for gradually decaying the magnitude of said memorized signal after its application to said second servo means.

7. The apparatus of claim 6 wherein said memorizing means comprises a switch that is normally closed when said first servo means is connected to said shaft means, a resistor, and an RC circuit connected in series with said resistor by means of said switch, said switch being adapted to be open when said second servo means connects to drive said shaft means.

8. Autopilot apparatus for aircraft comprising means for moving a foil on said craft, means for providing craft attitude error signals, means for producing a signal representing the integral of signals applied thereto, means for summing the integral signal and said attitude error signals to produce a control signal, first servo means adapted to receive said control signal, said first servo means being connected normally to move said foil in response to said control signal, means for producing a signal representing only short term craft attitude errors, second servo means adapted to receive said short term attitude error signals, said second servo means being normally unconnected to move said foil, means for detecting malfunctions in said first servo means, means cooperating with said malfunction detection means for disconnecting said first servo means from said foil and connecting thereto instead said second servo means, means for use in applying a force that prevents substantial movement of said foil immediately after said second servo means is connected thereto, and means for gradually decreasing the magnitude of said force.

9. Autopilot apparatus for aircraft comprising shaft means for driving a foil on said craft, means for providing craft attitude error signals, means for providing a signal representing the integral of signals applied thereto, means for summing the integral signal and said attitude error signals to produce a control signal, first servo means adapted to receive said control signal, said first servo means being connected normally to drive said shaft means in response to said control signal, means for producing signals representing only short term craft attitude errors, second servo means adapted to receive said short term attitude signals, said second servo means being normally unconnected to drive said shaft means, means for detecting malfunctions in said first servo means, means cooperating with said malfunctions detection means for disconnecting said first servo means from said shaft means and connecting thereto instead said second servo means, means for producing a torque signal representing the torque on said shaft means exerted by said first servo means, means for applying said torque signal to said second servo means immediately after said second servo means is connected to drive said shaft means and means for gradually decaying the magnitude of said torque signal after its application to said second servo means.

10. Autopilot apparatus for aircraft comprising shaft means adapted to be driven, first algebraic summing means adapted to receive an input signal, said input signal representing the sum of a craft attitude error and an integrated error, first servo means being provided with first feedback means for producing a first feedback representative signal, said first servo means being connected normally to drive said shaft means in proportion to its applied signal, and said first feedback signal being applied to said first summing means, the output of which is applied to said first servo means, second algebraic summing means adapted to receive an input signal representing short term variations of said craft attitude error, second servo means being unconnected normally to drive said shaft means and being provided with second feedback means for producing a second feedback signal, said second feedback signal being applied to said second algebraic summing means, the output of which is applied to said second servo means, means for detecting malfunctions in said first servo means, and means cooperating with said malfunctions detection means for disconnecting said first servo means from said shaft means and connecting thereto instead said second servo means, means for memorizing the signal applied to said first servo means, means for applying said memorized signal to said second servo means immediately after said second servo means is connected to drive said shaft means, and means for gradually decaying the magnitude of said memorized signal after its application to said second servo means.

References Cited
UNITED STATES PATENTS

| | | | |
|---|---|---|---|
| 2,945,170 | 7/1960 | Jones et al. | 318—489 |
| 3,044,002 | 7/1962 | Lejon | 318—446 |
| 3,128,968 | 4/1964 | Kaufman et al. | 244—77 |
| 3,145,330 | 8/1964 | Hecht | 318—489 XR |
| 3,143,693 | 8/1964 | Fearnside et al. | 318—8 |
| 3,149,272 | 9/1964 | Dendy | 318—489 XR |
| 3,286,143 | 11/1966 | Kurtz et al. | 318—18 |

BENJAMIN DOBECK, *Primary Examiner.*